April 28, 1959 W. H. HULSWIT, JR., ET AL 2,884,044
METHOD OF MAKING PNEUMATIC TIRES
Filed Nov. 9, 1954
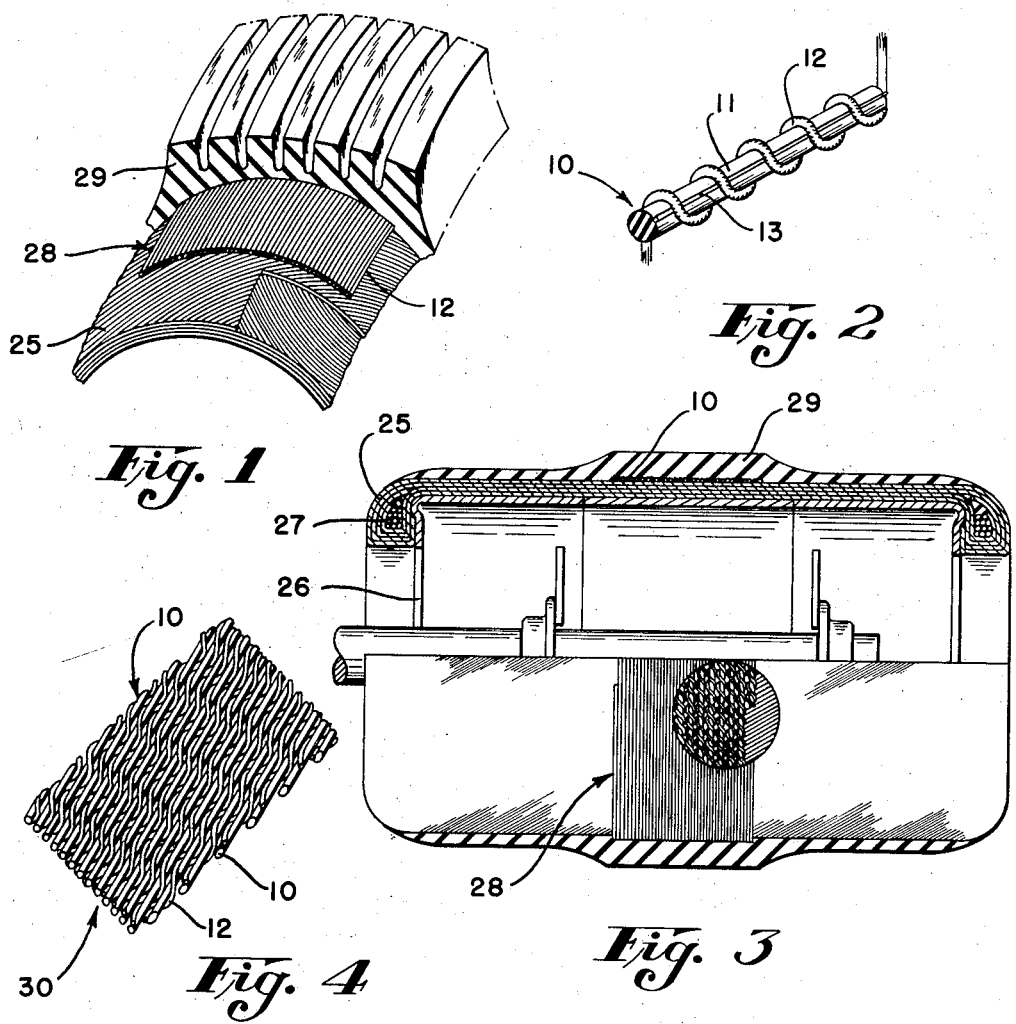
INVENTOR.
WILLIAM H. HULSWIT, JR.
BY VERNE H. BERRY
KENNETH A. REID
James J. Long
AGENT.

United States Patent Office 2,884,044
Patented Apr. 28, 1959

2,884,044

METHOD OF MAKING PNEUMATIC TIRES

William H. Hulswit, Jr., Grosse Pointe, Verne H. Berry, Roseville, and Kenneth A. Reid, Grosse Pointe Woods, Mich., assignors to United States Rubber Company, New York, N.Y., a corporation of New Jersey Application November 9, 1954, Serial No. 467,716

5 Claims. (Cl. 154—14)

This invention relates to a method of making pneumatic tires, and more particularly it relates to a method of making pneumatic tires embodying in the crown region supplementary reinforcing plies having cords disposed essentially circumferentially of the tire.

One object of the invention is to provide a method of making pneumatic tires having unusual structural characteristics that are conducive to improved service and reduced wear.

Another object of the invention is the provision of a method of making pneumatic tires which leads to a particularly favorable distribution of strains in the tire, resulting in reduced power consumption at high operating speeds.

It is still another object to provide a method of incorporating in tires additional reinforcement in the form of breaker plies or shock pads in which the cords are disposed circumferentially of the tire or essentially circumferentially, that is, at a very low angle to the circumferential, without sacrificing resistance to groove cracking.

Still a further object of the invention is to provide a method of tire construction which permits circumferential or essentially circumferential breakers or the like to be incorporated in the tire, while still allowing for considerable expansion of the tire in the course of the shaping operation.

The manner in which the invention realizes the foregoing and additional objects and advantages will be made manifest in the following detailed description, which is intended to be read with reference to the accompanying drawing, wherein:

Fig. 1 is a fragmentary perspective view, with parts broken away, of a cured tire constructed in accordance with the invention and including a circumferential breaker strip;

Fig. 2 is a perspective view on a larger scale of a cord assembly used in the breaker strip of the tire of Fig. 1, as it appears before assembly in the tire;

Fig. 3 is a transverse elevational view on a smaller scale, with parts shown in section and parts broken away, of the raw tire as initially assembled in band form on a tire building drum, a small circular area of the breaker strip being magnified to show the construction of the breaker cord; and, Fig. 4 is a fragmentary perspective view of a portion of bias-cut breaker fabric employed in a modification of the invention.

The invention involves building the tire initially in the form of an essentially flat band, suitably on the usual collapsible tire building drum, and thereafter shaping the raw tire into the form of a torus. The shaping may be accomplished with the aid of the usual shaping box, in which a curing bag is inserted in the tire as it is shaped, or the shaping may be accomplished with the aid of that type of curing mold containing an integral curing bag or diaphragm, and adapted to shape the tire automatically from band form into toroidal form as the mold is closed.

In either case, the tire is thereafter molded and cured under heat and pressure in the mold. It will be understood that the shaping of the raw assembly from band form into tire form involves considerable stretching or expansion of the components, particularly in the crown region, because the circumference of the tire greatly increases as it is shaped. This increase is greatest at the crown, and least toward the beads, which are of course essentially inextensible. When the reinforcing cords of the tire are at a substantial angle to the circumferential, as is necessary in conventional practice, the shaping and expansion of the tire give rise to no particular difficulty, since such expansion is accompanied by a change in angle of the cords, without subjecting them to undue stress. However, the expansion of the tire could not be accomplished satisfactorily in ordinary practice if the cord angle were low, since the cords would then be subjected to excessive strains.

The invention contemplates the inclusion of additional reinforcing material in the crown or tread region of the tire, suitably in the form of one or more breaker plies or breaker strips, or shock pads, based on relatively inextensible stranded reinforcing elements typically in the form of plied yarns, cords or cables. The cords or the like in such breaker or other reinforcement are disposed essentially circumferentially of the tire, that is, they pass around the tire at an extremely low cord angle, and in a preferred form of the invention the cord angle is zero. The invention provides for the necessary expansion or stretching of the circumferential reinforcement, consequent to the shaping operation, by initially disposing the cord or similar reinforcement in the form of a helix wound around a core of raw vulcanizable rubber stock. This helically-wound rubber-cored reinforcement is incorporated in such form in the tire assembly in band form on the building drum, and when the tire is subsequently expanded and shaped, the helically wound cord or similar reinforcement assumes a straight attitude under the influence of the stretching forces then applied. In this way the necessary effective increase in length of the cord in the finally shaped tire as compared to the tire as initially built is provided for without subjecting the cord to undue stress or strain, and without occasioning undesirable distortion or displacement of the parts from their proper operating positions. The pitch or rise of the helix in which the cord is wound and the diameter of the rubber core are so selected that the degree of expansion occurring in shaping will be sufficient to straighten the cord out in a taut, moderately stressed condition in which it is most effective for its intended purpose. In ordinary practice, a helix or twist such that stretching of the order of 50% to 70% is necessary to straighten the cord will be suitable, it being understood that the exact value most suitable for a given case will be proportionate to the degree of expansion occurring during shaping. It will be understood that the rubber core about which the cord is wound, being made of raw carcass stock, does not interfere with the straightening out of the cord during the shaping process because the cord simply cuts through the raw rubber and the rubber ultimately flows around and essentially encases the cord, and merges with the adjacent rubber stocks of the tire, and becomes firmly and permanently adhered thereto in the course of the vulcanization of the tire.

The helically-wound rubber-cored reinforcement is typically applied, as indicated, in the form of a breaker strip or shock pad. There may be employed more than one such strip or pad if desired, and each strip or pad may in turn be made up of more than one ply or layer, if necessary. A given strip may encircle the tire more than once, if desired, or it may pass around the tire only once, with some overlap to form a splice. Such reinforcing strips or plies extend over at least the crown or tread portion of the tire, and although they normally terminate laterally at a point short of or in the shoulder region, one or more of the plies may also extend beyond the shoulders more or less into the sidewall region. These breaker or similar plies are usually disposed directly upon the last or upper ply of the carcass, although additional layers of rubber stock, with or without any desired kind of reinforcement, may intervene between the carcass and the breaker strip of the invention, or between such breaker strip and the tread. Breakers or reinforcement of the crown area in accordance with the invention may also be employed in conjunction with breakers or the like of conventional construction embodying cords disposed at a bias at a high angle, sufficient to permit expansion during shaping.

When the breaker ply or the like is to be disposed circumferentially of the tire it is conveniently incorporated by winding circumferentially on an appropriate central zone of the tire carcass, contained on the tire building drum, a continuous length of the helically-wound rubber-cored cord. If desired, two or more such cords may be wound around together. More than one reinforcing layer may be formed in this manner. In the event that a slight angle or bias is desired in the cords, it is more convenient to prepare, from the helically-wound rubber-cored cord, a cord fabric analogous to conventional tire fabric. In such cord fabric the helically-wound rubber-cored cords are disposed in side-by-side parallel relation and they are maintained in place either with the aid of an occasional cross-thread or cord, and/or with the aid of an adhesive deposited on the cords by passing them through the usual tire cord solution (ordinarily rubber latex containing a resin) and drying them in the desired parallel condition. The latex deposit serves to adhere the cords together and has the further advantage of promoting good adhesion of the cord to adjacent rubber surfaces during the vulcanization of the tire. Although such cord fabric may be skim-coated on one or both sides with a thin layer of vulcanizable rubber carcass stock or other suitable stock, this is frequently unnecessary because an adequate amount of rubber to embed the cords and bind them to adjacent components of the tire is provided by the rubber core on which the cord is wound. The rubber core is most suitably composed of rubber stock compounded in the same manner as conventional tire carcass stocks, but other suitable stocks may also be used if desired. The cord which is wound around the rubber core may have the same construction as the cords conventionally used in breaker strips or carcass reinforcement, and it may be based on any of the usual textile materials whether natural, such as cotton, or synthetic such as rayon or nylon, as well as steel wire, or glass cord. Although the nylon is ordinarily employed in the form of plied yarns, rather than cord, and the wire is ordinarily employed in the form of cable, these various constructions are usually referred to loosely in the trade as tire cords, and it will be understood that the expression "tire cord" as used in the present specification and claims is intended to include such nylon or wire constructions, unless otherwise expressly noted.

Although the cord assembly for use in the invention may be prepared if desired by winding a suitable cord around the raw rubber core by hand, it will be appreciated that it is more satisfactory in practice to employ winding machinery of the kind conventional in the textile industry. Thus, referring to the drawing, and in particular to Fig. 2, a typical cord assembly 10 for use in the invention has a core 11 of raw vulcanizable rubber carcass stock around which there is wound a tire cord 12 in spiral fashion. The assembly includes a small pick cord 13 extending parallel to the core and preferably lightly adhered to the surface thereof. The pick cord is rather weak, having just enough strength to give dimensional stability and to resist extension of the assembly while it is being handled and incorporated in the tire. This assembly may be prepared, for example by extruding rubber carcass stock from a conventional extruder in the form of an elongated rod. The pick cord 13 is then cemented and laid along one side of the extruded rubber rod. Thereafter, the tire cord 12 is wound helically about the assembly. The tire cord is typically treated with the usual tire cord adhesive solution, usually based on a mixture of rubber latex and resin, before being incorporated in the assembly. The resulting assembly is then suitably dusted with talc and wound on a reel until such time as it is desired to fabricate it into cord fabric or otherwise incorporate it in a tire.

In the method illustrated in Fig. 3 for incorporating the helically-wound rubber-cored cord 10 in the tire, a tire carcass 25 is built up in the form of a flat band by superimposing successive plies of rubberized tire fabric on the building surface of a tire building drum 26, with the usual inextensible bead members 27 contained in the overlapped marginal edge portions of the plies. Thereafter, the composite helically-wound rubber-cored cord assembly 10 is wound around the central outer surface of the carcass to provide thereon a breaker strip or ply 28 in which the composite cord extends circumferentially, that is, at zero cord angle. The cord assembly 10 is wound on under just sufficient tension to remain taut and the pick cord 13 keeps the assembly from stretching or the spiral from straightening out while this is being done. Subsequently a raw rubber tread and sidewall body 29 is superimposed on the assembly to provide the exterior rubber covering of the tire.

The thus assembled raw tire band is then removed from the tire building drum and is shaped in the form of a torus, and cured in such form under heat and pressure in a tire mold to provide the completed tire as shown in Fig. 1. As indicated previously, the tire expands considerably as it is shaped. This places sufficient stress on the pick cords 13 to break them into small pieces and the helically wound cord 12 straightens out, cutting through the soft rubber core 11 which exudes around the cord as it straightens out. In the finally vulcanized assembly the cord 12 therefore is disposed straight and taut, as illustrated in Fig. 1, and it is embedded in a thin layer of vulcanized rubber stock representing what was formerly the rubber core of the spiral cord, and this stock is adherently vulcanized to the adjacent portions of the tire. The small pieces of broken pick cord remain in the final assembly, but do no harm.

In the modification of the invention shown in Fig. 4, the helically-wound rubber-cored cord 10 is formed into cord fabric which is bias-cut in the form of a breaker strip 30 of suitable size. The breaker strip has a low cord angle, suitably of 20° or less, and it is applied to the tire carcass on the tire building drum, after which the tread is added and the tire is shaped and cured as before. The expansion of the tire as it is shaped causes the pick cords to break and the breaker cords straighten out and are embedded in the final assembly as previously described, except for being at a slight angle to the circumference instead of purely circumferential.

It has been determined by actual factory trials and road tests that pneumatic tires made in accordance with the invention have a number of desirable characteristics and advantages. The method described permits the tire to contain breaker strips or similar added reinforcement of unprecedentedly low cord angles, viz., 0° to 20°, without encountering difficulty in the shaping operation. Shaping operations involving extensions of the order of 55%, 60%, 65% or more are carried out without difficulty, in spite of the low angle. It will be understood that with the prior art techniques this could not be done, and such expansion would require the use of a high cord angle, e.g., 50° to 65°, in breaker cords in prior practice.

The tires made in this manner are notable for their improved wearing qualities, good riding comfort, stability, and freedom from undue groove cracking and cornering squeal.

Dynamic measurements indicate that tires having circumferential shock pads incorporated in accordance with the invention undergo rather different strains than conventional tires. In general, strains in the crown region are lower. In particular, the positive strains in the lateral direction can be significantly reduced, both on the band ply and on the outside of the tire. Similarly, circumferential strains can be reduced. The more favorable strain conditions are reflected in improved tread wear and freedom from excessive groove cracking.

In a typical comparison of a tire made in accordance with the invention and a conventional tire, the present tire had a power consumption at 100 miles per hour approximately three horsepower less than the regular tire (which consumed 18 horsepower). Also, no tread distortion could be seen in the present tire at 100 miles per hour, whereas the conventionally made tire showed the usual distortion wave. These observations are indicative of unusually good high speed performance.

Having thus described our invention, what we claim and desire to protect by Letters Patent is:

1. In a method of making a pneumatic tire having an inner reinforcing carcass and an outer rubber tread covering, and additional reinforcing cords disposed essentially circumferentially between said carcass and tread, the improvement comprising in combination the steps of assembling the said carcass in the form of an essentially flat band, providing additional reinforcing cords comprised of tire cord helically wrapped around an elongated raw, vulcanizable rubber core, applying said additional reinforcing cords essentially circumferentially of the carcass in the crown region thereof, applying the outer rubber tread, and shaping the assembly in toroidal form while expanding the same, whereby the said helically wrapped cords straighten out within the assembly, and vulcanizing the assembly under heat and pressure whereby said cords are firmly embedded therein.

2. In a method of making a pneumatic tire having an inner reinforcing carcass and an outer rubber tread covering, and additional reinforcement in the form of a breaker disposed in the crown of the tire between the carcass and the tread, the improvement comprising in combination the steps of assembling the said carcass in band form, applying a breaker comprised of tire cord helically wrapped around a raw, vulcanizable rubber core, applying the outer rubber tread, shaping the band in tire form with simultaneous expansion sufficient to straighten out the said helically wrapped cord, and vulcanizing the assembly.

3. A method of making a pneumatic tire comprising in combination the steps of building a tire carcass in band form of rubberized plies of tire cord fabric in which the cords pass on a bias across the crown of the tire from one bead to the other, providing additional reinforcement in the form of tire cord helically wound around a raw, vulcanizable rubber core, winding said additional reinforcement circumferentially around the outer surface of the carcass in the crown region thereof, applying a tread to the assembly and expanding the same into tire form whereby said circumferentially wound additional reinforcement is stretched and the said helically wound cord assumes a straight, taut disposition in which it is embedded in said rubber constituting the said core around which the core was wound, and vulcanizing the assembly in tire form.

4. A method of making a pneumatic tire comprising in combination the steps of building a tire carcass in band form of rubberized plies of tire cord fabric in which the cords pass on a bias across the crown of the tire from one bead to the other, providing a breaker cord fabric comprised of tire cords helically wound around a raw, vulcanizable rubber core, the cord angle of said breaker fabric being from 0° to 20°, applying a tread to the assembly, expanding and stretching the band into tire shape, and vulcanizing the assembly in tire shape, the degree of expansion being such that the cords in the said breaker are stretched by from 50% to 70% and thereby become straight and taut in the final assembly, wherein they are embedded in, and secured to the remainder of the assembly by, the rubber of the said core around which they were wound, which rubber flows around and substantially embeds said breaker cords as they straighten out from said helical form as a result of the expansion.

5. A method of making a pneumatic tire including the steps of incorporating in the raw tire in band form, in the crown region thereof, a breaker of low cord angle comprised of tire cords wound around a raw, vulcanizable rubber core to which is attached a weak, temporary reinforcing element to maintain dimensional stability during assembly, thereafter shaping the tire, such shaping involving stretching the said cords by the order of 50% to 70% whereby the said cords straighten out and become taut, while the said weak, temporary reinforcing element is broken, and vulcanizing the tire in such shape.

References Cited in the file of this patent

UNITED STATES PATENTS

| | | |
|---|---|---|
| 1,822,847 | Adamson | Sept. 8, 1931 |
| 2,147,736 | Dreyfus | Feb. 21, 1939 |
| 2,354,449 | Alderfer | July 25, 1944 |
| 2,441,071 | Jahant | May 4, 1948 |
| 2,501,644 | Kraft et al. | Mar. 21, 1950 |
| 2,541,506 | Cuthbertson | Feb. 13, 1951 |
| 2,625,980 | Castricum | Jan. 20, 1953 |
| 2,625,981 | Wallace | Jan. 20, 1953 |
| 2,692,005 | DeCloud | Oct. 19, 1954 |
| 2,703,128 | Darrow | Mar. 1, 1955 |
| 2,733,179 | Smith | Jan. 31, 1956 |
| 2,740,402 | Scholl | Apr. 3, 1956 |
| 2,755,214 | Lyons et al. | July 17, 1956 |
| 2,840,882 | Smith | July 1, 1958 |